United States Patent Office 3,378,591
Patented Apr. 16, 1968

3,378,591
PRODUCTION OF 1-NAPHTHOL
Benjamin T. Freure, Charleston, W. Va., assignor to Union Carbide Corporation, a corporation of New York
No Drawing. Filed Feb. 14, 1964, Ser. No. 344,813
6 Claims. (Cl. 260—621)

This invention relates to a novel catalytic process for producing 1-naphthol and to a catalyst therefore. More particularly, this invention relates to an improved process for the conversion of 3,4-dihydro-1(2H)-naphthaleneone to 1-naphthol and a catalyst therefor.

A convenient method for the production of 1-naphthol comprises the catalytic vapor phase dehydrogenation of 3,4-dihydro-1-(2H)-naphthaleneone to 1-naphthol. The most desirable catalysts for effecting the dehydrogenation are platinum catalysts because of their resistance to poisoning by sulfur or chlorine and their long life at the elevated temperatures necessary for good yields of 1-naphthol. The platinum catalysts of the prior art suffer from one main drawback, however; they are incapable of promoting a sufficiently high degree of conversion of tetralone to naphthol to be commercially useful. The reaction product generally comprises a mixture of naphthol and 3,4-dihydro-1-(2H)-naphthaleneone which, because these components form a maximum boiling azeotrope which boils at a temperature about 5° C. above the boiling point of naphthol, precludes distillation as a means of recovering the 1-naphthol.

Thus, other methods, such as crystallization of the naphthol from a hydrocarbon such as heptane are employed to recover the naphthol. It has been found, however, that, for the dehydrogenation and subsequent crystallization to be commercially feasible, the weight ratio of naphthol to 3,4-dihydro-1-(2H)-naphthaleneone in the dehydrogenation product must be at least 4:1. A catalyst consisting of platinum alone on a suitable support material is incapable of maintaining the high degree of conversion necessary to achieve this ratio for a sufficient length of time to permit its use in a commercial process.

It has been found by this invention that if the platinum catalyst contains a small amount of sodium the yields and efficiency of the process are increased and the catalyst life is greatly prolonged. This promoting effect is specific with sodium, and is not observed with any other alkali metal. In fact, the presence of alkali metals other than sodium actually decreases both the life of the platinum catalyst and the yield of the reaction.

The catalysts of this invention generally comprise platinum metal and an inorganic sodium compound on a support material. The amount of platinum can vary from about 0.25 weight percent to about 5 weight percent. Amounts of from 0.9 to 1.25 weight percent platinum are preferred because at smaller amounts the catalyst cannot be reactivated satisfactorily and there is no increase in catalytic activity or life with larger amounts.

The amount of sodium employed can vary from 0.25 to 1.5 weight percent. It is preferred, however, to employ from about 0.6 to about 0.8 weight percent because of the outstanding superiority of such catalysts. The sodium is present in the form of an ionic compound, such as sodium hydroxide, sodium chloride, sodium carbonate, sodium sulfate and the like. In some instances it is desirable that the sodium be present, in part, as sodium sulfate. For example, when the support material is gamma-alumina it has been found that the presence of sulfate ion, hereinafter referred to solely as sulfate, in amounts of from 0.15 to 1.5 weight percent, and preferably from about 0.25 to about 0.5 weight percent, increases yield, efficiency and catalyst life. The effectiveness of the sulfate decreases, however, with decreasing amounts of gamma-alumina in the alumina support and has little promoting effect on a purely alpha-alumina support.

Any suitable support material can be employed, such as activated carbon, silica, alumina, asbestos, aluminum silicates, and the like. It has been found, however, that catalytic activity and life vary with the support material. For example, catalysts having alpha-alumina as the support are considerably less active and have a much shorter life than those having gamma-alumina as the support material. Nevertheless, sodium does have a promoting effect on platinum regardless of the support material employed.

The catalyst can be prepared in any convenient manner. A preferred method comprises admixing an aqueous solution of chloroplatinic acid and one or more inorganic sodium compounds, preferably sodium carbonate and sodium sulfate, with a support material and drying at elevated temperatures to remove water. The catalyst is activated by reduction in any suitable manner, such as by passing hydrogen gas through a bed of the catalyst at a temperature in excess of about 250° C., and preferably at about 375° C. for 16 hours.

The process of this invention comprises contacting in the vapor phase a feed containing 3,4-dihydro-1-(2H)-naphthaleneone with the reduced catalyst under conditions sufficient to effect the dehydrogenation and to produce a product wherein the weight ratio of 1-naphthol to 3,4-dihydro-1-(2H)-naphthaleneone is at least 4:1.

The 3,4-dihydro-1-(2H)-naphthaleneone is readily produced by an air oxidation of 1,2,3,4-tetrahydronaphthalene. The oxidation product comprises a mixture of tetralone and 1,2,3,4-tetrahydro-1-naphthol (1-tetralol). This oxidation product may be employed directly in the process of this invention if desired. It is preferred, however, to subject the oxidation product to a mild catalytic dehydrogenation over a nickel or copper catalyst to convert the tetralol to tetralone prior to carrying out the process of this invention because of the tendency of the platinum catalyst to dehydrate rather than dehydrogenate the 1,2,3,4-tetrahydro-1-naphthol, thereby reducing the efficiency of the process.

In general the temperature at which the dehydrogenation is conducted can vary from about 250° C. to about 450° C., with temperatures of from about 350° C. to about 400° C. preferred. At temperatures below 250° C., for example about 225° C., the feed will not remain vaporized and may leach out the sodium salts in the catalyst, and thereby deactivate the catalyst. At temperatures greater than 450° C., for example about 500° C., coke formation is accelerated to such an extent that complete and irreversible deactivation of the catalyst occurs.

The pressure at which the dehydrogenation is effected is not particularly critical, although extremely high pressures will hinder the dehydrogenation. The reaction proceeds readily at or slightly above atmospheric pressure, however, and, thus, these pressures are normally employed.

Although not necessary, it is desirable to feed the tetralone to the reaction in admixture with hydrogen gas to assist in vaporization of the feed and to prolong catalyst life. The amount of hydrogen is not narrowly critical, and amounts of from about 0.5 to about 15 or more moles of hydrogen per mole of feed can be employed. Optimum amounts are from about 2:1 to about 6:1.

The rate of feed of the 3,4-dihydro-1-(2H)-naphthaleneone to the reaction can vary from about 0.3 to about 5 or more liters per liter of catalyst bed per hour, with feed rates of from about 0.4 to about 1.0 l./l./hr. being preferred. For maximum efficiency of the dehydrogenation, the feed rate should be the maximum rate at which a naphthol/3,4-dihydro-1-(2H)-naphthaleneone weight ratio of above 4:1 can be obtained, which will decrease during the life of the catalyst. It is preferred that, when the desired naphthol/3,4-dihydro-1-(2H)-naphthaleneone weight ratio of 4:1 cannot be maintained at a feed rate of at least 0.4 l./l./hr., the catalyst be reactivated because the rate of production of 1-naphthol is too low at lower feed rates for a commercial process.

The catalyst is reactivated by flushing the catalyst bed with nitrogen or other inert gas to remove hydrogen, followed by an oxidation to burn off carbon deposits on the catalyst by blowing air diluted with nitrogen through the catalyst bed until the amount of carbon dioxide in the off gas falls to about 0.5 volume percent. Since this reaction is exothermic, it is preferred that the oxygen content of the oxidizing gas be below about 2 volume percent, at least in the early stages, to ensure against destruction or deactivation of the catalyst.

After oxidation, the catalyst bed is purged with nitrogen or other inert gas to remove oxygen, and then the catalyst is activated as previously described.

The following examples are illustrative of this invention. In these examples the percent yield and efficiency were calculated by the following equations:

$$\text{Per cent yield} = \left(\frac{A}{B}\right) \times 100$$

$$\text{Per cent efficiency} = \left(\frac{A}{B-C}\right) \times 100$$

wherein A is the difference between the mole percent of 1-naphthol in the product and feed streams; B is the total mole percent of 1,2,3,4-tetrahydro-1-naphthol and/or 3,4-dihydro-1-(2H)-naphthaleneone in the feed; and C is the total mole percent of 3,4-dihydro-1-(2H)-naphthaleneone and/or 1,2,3,4-tetrahydro-1-naphthol in the product stream.

Example 1

To a solution of 0.37 gram of anhydrous sodium sulfate and 0.74 gram of anhydrous sodium carbonate in 30 grams of water was added a solution of 1.88 grams of chloroplatinic acid ($H_2Pt_4Cl_6 \cdot 6H_2O$) in 10 grams of water, with evolution of carbon dioxide. The resulting clear solution was admixed with 75 grams of ⅛-inch diameter by ⅛-inch long pellets of a mixture of alpha and gamma-alumina having a surface area of 32 square meters per gram and a pore volume of 0.41 cubic centimeter per gram.

After drying for 3 hours on a steam bath the mixture was found to contain 1.06 weight percent platinum, 0.66 weight percent sodium and 0.27 weight percent sulfate ion.

The dried material was charged to a ¾-inch diameter by 40-inch long reactor, heated to 375° C. and reduced by passing hydrogen gas through the bed at a rate of 10 liters per hour for 16 hours. At the end of this time a feed consisting of 72 weight percent 3,4-dihydro-1-(2H)-naphthaleneone, 26 weight percent 1-naphthol, 1.0 weight percent 1,2,3,4-tetrahydro-1-naphthol and 0.7 weight percent hydrocarbons was fed to the bed at a rate of 500 ml./l./hr. in admixture with hydrogen in a mole ratio of hydrogen to feed of 3:1. The feed rate was increased to 800 milliliters per liter per hour for maximum efficiency and was maintained at that rate for about 400 hours, at which time the naphthol/3,4-dihydro-1-(2H)-naphthaleneone weight ratio in the product had fallen to 4:1. The feed rate was then reduced to 600 ml./l./hr. to increase the naphthol/3,4-dihydro-1-(2H)-naphthaleneone weight ratio to greater than 4:1, and was maintained at that rate for 260 hours, when the naphthol/3,4-dihydro-1-(2H)-naphthaleneone weight ratio again fell to 4:1. The feed rate was reduced to 400 ml./l./hr. to increase the naphthol/3,4-dihydro-1-(2H)-naphthaleneone ratio and maintained at that rate for 640 hours when the naphthol/3,4-dihydro-1-(2H)-naphthaleneone ratio again fell to 4:1 and the run was terminated after a total catalyst life of 1,300 hours.

The catalyst was reactivated by first passing air diluted with nitrogen to an oxygen content of about 2 percent to burn off deposited carbon, purging with nitrogen to remove oxygen and then passing hydrogen through the bed at a rate of 10 liters per hour for 16 hours.

This cycle of dehydrogenation and reactivation was repeated until in the fifth cycle the experiment was terminated after a total of 5775 hours of catalyst use even though the catalyst was still active. The results for these five runs are summarized in Table I below.

TABLE I

| Run | Life, hours | Average Yield, Percent | Average Efficiency, Percent |
| --- | --- | --- | --- |
| 1 | 1,300 | 82 | 98 |
| 2 | 1,450 | 80 | 96 |
| 3 | 1,130 | 81 | 97 |
| 4 | 1,070 | 80 | 97 |
| 5 | 825 | 79 | 96 |

Example 2

Employing apparatus and procedures similar to those described in Example 1, catalysts were prepared in which lithium, potassium, rubidium or cesium was substituted for the sodium, and then employed to dehydrogenate 3,4-dihydro-1-(2H)-naphthaleneone to naphthol. The results of these experiments are summarized in Table II.

TABLE II

| Run | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| Alkali metal | Li | Li | Na | K | K | K | Rb | Rb | Cs | Cs | Cs | None |
| Weight, percent | 0.18 | 0.36 | 0.60 | 0.60 | 1.0 | 2.0 | 1.0 | 2.0 | 1.0 | 2.0 | 3.5 | |
| Atom, percent [1] | 0.026 | 0.052 | 0.026 | 0.0153 | 0.0256 | 0.0512 | 0.0177 | 0.0234 | 0.0075 | 0.0150 | 0.0263 | |
| Feed Rate, l./l./hr | 0.4 | 0.4 | [2] 0.55 | 0.4 | 0.4 | 0.4 | 0.4 | 0.4 | 0.4 | 0.4 | 0.4 | 0.48 [3] |
| Maximum yield, percent | 77 | 52 | 85 | 57 | 54 | 48 | 38 | 22 | 64 | 16 | 19 | 75 |
| Corresponding Efficiency, percent | 89 | 69 | 97 | 95 | 96 | 74 | 91 | 83 | 87 | 84 | 85 | 90 |
| Life, hours | 24 | 0 | 1,300 | 0 | 0 | 0 | 0 | 0 | 0 | 0 | 0 | 73 |

[1] Calculated by dividing weight percent by the atomic weight of the alkali metal.
[2] Average feed rate—Actual values were 400 hours at 0.8 l./l./hr; 260 hours at 0.6 l./l./hr; and 640 hours at 0.4 l./l./hr.
[3] Average feed rate—Actual values were 7 hours at 0.8 l./l./hr; 16 hours at 0.6 l./l./hr; and 50 hours at 0.4 l./l./hr.

From the data presented in Table II it can be seen that of the alkali metals, only sodium acts as a promoter for a platinum catalyst employed in the dehydrogenation of 3,4-dihydro-1-(2H)-naphthaleneone. Of the catalysts tested, only three, the one containing platinum alone (Run 12), one containing platinum and lithium (Run 1) and the one containing platinum and sodium (Run 3), were capable of maintaining naphthol/3,4-dihydro-1-(2H-naphthaleneone ratios in excess of 4:1. Of these three, only the platinum catalyst and the sodium-promoted catalyst were capable of supporting feed rates in excess of 0.4 l./l./hr. Finally, the platinum catalyst became inactive after processing only 35.2 liters of feed per liter of catalyst in only 73 hours, whereas the sodium-platinum catalyst processed 715 liters of feed per liter of catalyst in 1,300 hours before becoming inactive, an increase of over 1,930 percent in the amount of feed processed and about 1,680 percent in catalyst life.

Example 3

Employing apparatus and procedures similar to those described in Example 1, a series of catalysts was produced by impregnating a commercially available alpha-alumina support material with chloroplatinic acid, reducing, leaching to remove chlorine, and impregnating with varying amounts of sodium carbonate. The resulting catalysts were employed to dehydrogenate a feed containing 68 weight percent 3,4-dihydro-1-(2H)-naphthaleneone, 28 weight percent 1,2,3,4-tetrahydro-1-naphthol and 4 weight percent hydrocarbons at 400° C., an average feed rate of 1.0 l./l./hr. and a hydrogen to feed mole ratio of 3:1. The results of these tests are summarized in tabular form, below.

| Catalyst | | Maximum Yield, Percent | Corresponding Efficiency, Percent | Life, Hours |
|---|---|---|---|---|
| Na, wt. Percent | Pt, wt. Percent | | | |
| 0.25 | 3.0 | 66 | 69 | 54 |
| 0.50 | 3.0 | 77 | 82 | 55 |
| 0.75 | 3.0 | 76 | 81 | 77 |
| 1.00 | 3.0 | 74 | 80 | 49 |

As can be seen from the table, yield and efficiency increase as the amount of sodium increases from 0.25 to 0.5 weight percent, and then level off at higher amounts of sodium. On the other hand, catalyst life is a maximum at about 0.75 weight percent sodium, and decreases at higher amounts of sodium.

Example 4

Employing apparatus and procedures similar to those described in Example 1, a commercially-available sample of activated gamma-alumina was impregnated with chloroplatinic acid, sodium sulfate and sodium carbonate to give a catalyst containing 1.0 weight percent platinum, 0.69 weight percent sodium and 0.33 weight percent sulfate, and employed to dehydrogenate 3,4-dihydro-1-(2H)-naphthaleneone. The results of this experiment are summarized in tabular form below.

| Run No. | Maximum Yield, percent | Corresponding Efficiency, Percent | Life, Hours |
|---|---|---|---|
| 1 | 87 | 97 | 390 |
| 2 | 86 | 96 | 400 |
| 3 | 85 | 97 | 360 |
| 4 | 83 | 96 | 360 |
| 5 | 83 | 94 | 1 225 |
| Total | | | 1,735 |

[1] Catalyst still active when experiment terminated.

In a second experiment, a catalyst was prepared in an identical manner, which contained 1.0 weight percent platinum, 0.69 weight percent sodium and no sulfate, and employed to dehydrogenate 3,4-dihydro-1-(2H)-naphthaleneone. The results of this experiment are set forth in tabular form below.

| Run No. | Maximum Yield, percent | Corresponding Efficiency, Percent | Life, Hours |
|---|---|---|---|
| 1 | 78 | 93 | 113 |
| 2 | 78 | 87 | 216 |
| 3 | 77 | 93 | 215 |
| Total | | | 544 |

From the above data it is clear that the presence of sulfate ion in a gamma-alumina-supported catalyst improves the yield and efficiency of the dehydrogenation employing platinum-sodium catalysts, and extends the catalyst life.

What is claimed is:
1. In a process for dehydrogenation 3,4-dihydro-1-(2H)-naphthaleneone to produce 1-naphthol, the improvement of conducting said process in contact with a catalyst consisting essentially of from 0.5 to 5 weight percent platinum, from 0.25 to 1.5 weight percent sodium in the form of sodium chloride and sodium sulfate, and from 0.15 to 1.5 weight percent sulfate, and the balance a support material consisting essentially of gamma-alumina, said sulfate based on a sulfate analysis of said catalyst and said support material.

2. In a process for dehydrogenating 3,4-dihydro-1-(2H)-naphthaleneone to produce 1-naphthol, the improvement of conducting said process in contact with a catalyst consisting essentially of from 0.9 to 1.25 weight percent platinum, from 0.6 to 0.8 weight percent sodium in the form of sodium chloride and sodium sulfate and from 0.25 to 0.5 weight percent sulfate, and the balance a support material consisting essentially of gamma-alumina, said sulfate based on a sulfate analysis of said catalyst and said support material.

3. In a process for dehydrogenating 3,4-dihydro-1-(2H)-naphthaleneone to form 1-naphthol wherein the feed rate is maintained at least at 0.4 liter/liter of catalyst/hour to provide a naphthol/3,4-dihydro-1(2H)-naphthaleneone weight ratio of at least 4:1 in the reaction product, the improvement of conducting said process in contact with a catalyst consisting essentially of from 0.5 to 5 weight percent platinum, from 0.25 to 1.5 weight percent sodium in the form of sodium chloride and sodium sulfate, and from 0.15 to 1.5 weight percent sulfate, and the balance a support material consisting essentially of gamma-alumina, said sulfate based on a sulfate analysis of said catalyst and said support material.

4. In a process for dehydrogenating 3,4-dihydro-1-(2H)-naphthaleneone to produce 1-naphthol, the improvement of conducting said process in contact with a catalyst consisting essentially of from 0.5 to 5 weight percent platinum, from 0.25 to 1.5 weight percent sodium in the form of sodium sulfate, and the balance a support material consisting essentially of gamma-alumina, said sulfate based on a sulfate analysis of said catalyst and said support material.

5. In a process for dehydrogenating 3,4-dihydro-1-(2H)-naphthaleneone to produce 1-naphthol, the improvement of conducting said process in contact with a catalyst consisting essentially of from 0.9 to 1.25 weight percent platinum, from 0.6 to 0.8 weight percent sodium in the form of sodium sulfate and the balance a support material consisting essentially of gamma-alumina, said sulfate based on a sulfate analysis of said catalyst and said support material.

6. In a process for dehydrogenating 3,4-dihydro-1-(2H)-naphthaleneone to form 1-naphthol wherein the feed rate is maintained at least at 0.4/liter/liter of catalyst/hour to provide a naphthol/3,4-dihydro-1(2H)-naphthaleneone weight ratio of at least 4:1 in the reaction product, the improvement of conducting said process in contact with a catalyst consisting essentially of from 0.5 to 5 weight percent platinum, from 0.25 to 1.5 weight percent sodium in the form of sodium sulfate, and the balance a support material consisting essentially of gamma-alumina, said sulfate based on a sulfate analysis of said catalyst and said support material.

References Cited

UNITED STATES PATENTS

| 2,503,641 | 4/1950 | Taylor et al. | 260—621 |
| 2,773,011 | 12/1956 | Hensel | 252—474 |
| 2,987,560 | 6/1961 | Hoomes et al. | 252—474 |

LEON ZITVER, Primary Examiner.

D. M. HELFER, H. ROBERTS, Assistant Examiners.